(12) United States Patent
Hadi

(10) Patent No.: US 11,331,972 B2
(45) Date of Patent: May 17, 2022

(54) MONOLITHIC SUSPENSION MODULE

(71) Applicant: DRiV Automotive Inc., Lake Forest, IL (US)

(72) Inventor: Rod Hadi, Grass Lake, MI (US)

(73) Assignee: DRiV Automotive Inc., Lake Forest, IL (US)

(*) Notice: Subject to any disclaimer, the term of this patent is extended or adjusted under 35 U.S.C. 154(b) by 51 days.

(21) Appl. No.: 16/777,144

(22) Filed: Jan. 30, 2020

(65) Prior Publication Data

US 2020/0247205 A1 Aug. 6, 2020

Related U.S. Application Data

(60) Provisional application No. 62/799,303, filed on Jan. 31, 2019.

(51) Int. Cl.
B60G 11/22 (2006.01)
B60G 3/20 (2006.01)
(Continued)

(52) U.S. Cl.
CPC ............... *B60G 11/22* (2013.01); *B60G 3/20* (2013.01); *B60G 17/02* (2013.01); *F16F 1/36* (2013.01); *F16F 1/377* (2013.01); *B60G 2200/14* (2013.01); *B60G 2202/14* (2013.01); *B60G 2206/42* (2013.01); *B60G 2206/73* (2013.01);
(Continued)

(58) Field of Classification Search
CPC .......... B60G 3/20; B60G 11/22; B60G 17/02; B60G 2200/14; B60G 2202/14; B60G 2206/42; B60G 2206/73; B60G 2800/162; F16F 1/36; F16F 1/377; F16F 1/376
See application file for complete search history.

(56) References Cited

U.S. PATENT DOCUMENTS 2,241,026 A 5/1941 Wylie
4,750,720 A * 6/1988 Wolf ....................... F16F 1/377
267/140.11

(Continued)

FOREIGN PATENT DOCUMENTS

CN 102829115 A * 12/2012 ............. B60G 11/22
CN 206067398 4/2017
(Continued)

OTHER PUBLICATIONS

Ciolczyk, Jean Pierre. "Machine Translation of FR 2786838 A1 Obtained May 10, 2021". Jun. 9, 2000. Entire Document (Year: 2000).*

(Continued)

*Primary Examiner* — Jonathan Ng
*Assistant Examiner* — Scott F. Underwood
(74) *Attorney, Agent, or Firm* — Burris Law, PLLC

(57) ABSTRACT

A vehicle suspension system includes a suspension arm connected to a vehicle frame or body. A wheel is supported by the suspension arm and a shock absorber is connected between the vehicle frame or body and the suspension arm. The shock absorber includes a first mounting fitting having a first connecting structure, a second mounting fitting having a second connecting structure and a monolithic elastomeric body molded around the first connecting structure and the second connecting structure.

15 Claims, 2 Drawing Sheets

Figure 1:
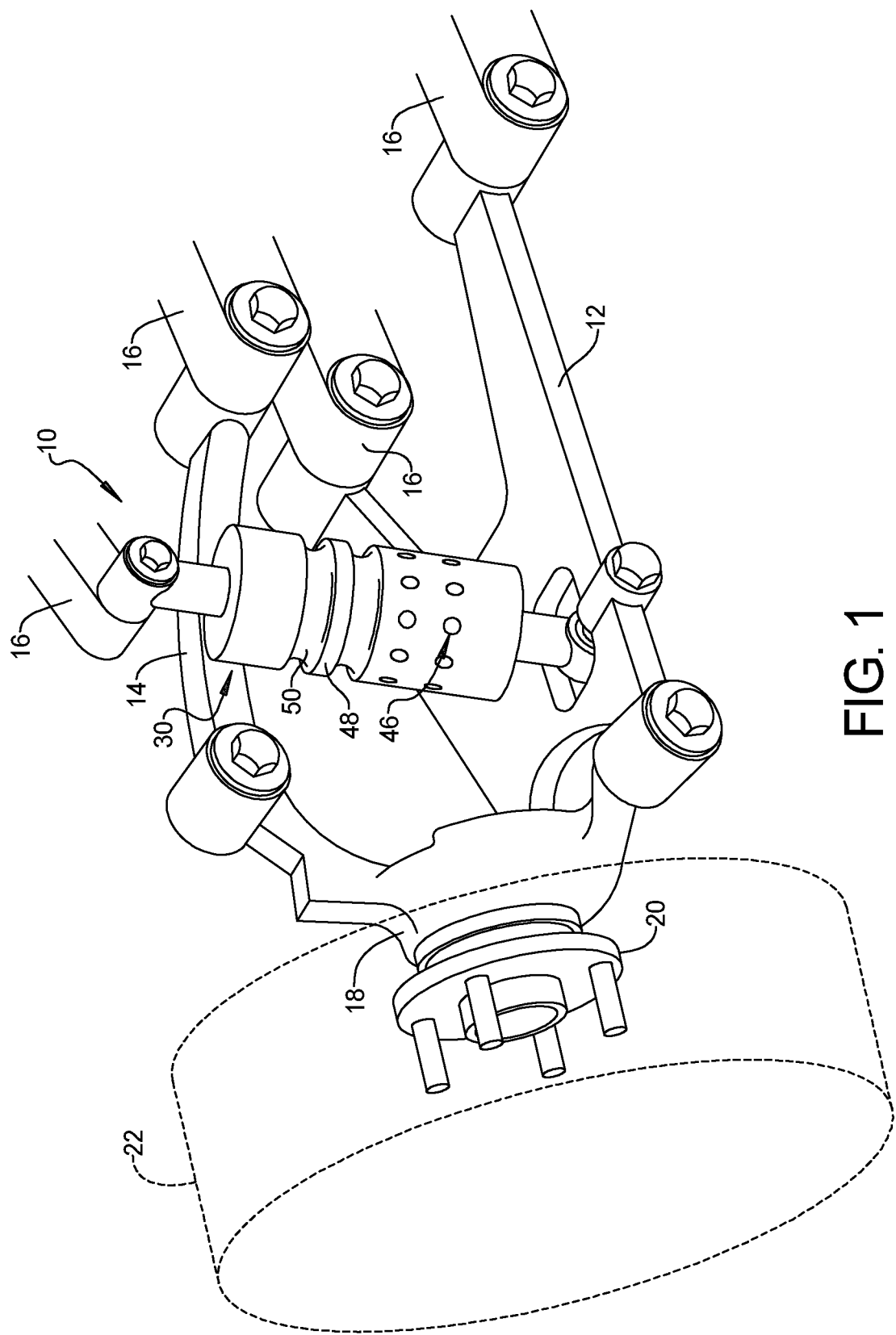

(51) Int. Cl.
  *B60G 17/02* (2006.01)
  *F16F 1/36* (2006.01)
  *F16F 1/377* (2006.01)

(52) U.S. Cl.
  CPC .. *B60G 2206/8101* (2013.01); *B60G 2500/20* (2013.01); *B60G 2800/162* (2013.01); *F16F 2224/025* (2013.01); *F16F 2226/04* (2013.01); *F16F 2228/066* (2013.01)

(56) References Cited

U.S. PATENT DOCUMENTS

| | | | |
|---|---|---|---|
| 5,449,152 A | | 9/1995 | Byrnes et al. |
| 7,175,167 B2 | | 2/2007 | Pennequin et al. |
| 8,733,746 B1 | | 5/2014 | Lamberti et al. |
| 2006/0273540 A1 | | 12/2006 | Heron et al. |
| 2007/0145654 A1 | * | 6/2007 | Wietharn ............... F16F 1/403 267/141.1 |
| 2008/0007022 A1 | | 1/2008 | Jones |
| 2017/0106711 A1 | | 4/2017 | Weston et al. |

FOREIGN PATENT DOCUMENTS

| | | | | | |
|---|---|---|---|---|---|
| CN | 107465293 A | * | 12/2017 | | |
| DE | 767872 C | * | 4/1954 | ............. | F16F 1/377 |
| DE | 2500149 | | 7/1975 | | |
| DE | 20109657 U1 | * | 10/2001 | ............. | B60G 11/22 |
| EP | 0637699 A1 | * | 2/1995 | ............. | F16F 1/377 |
| FR | 1008102 A | * | 5/1952 | ............. | B60G 11/22 |
| FR | 2786838 | | 6/2000 | | |
| GB | 2207730 A | * | 2/1989 | ............. | F16F 1/3713 |
| KR | 200438361 Y1 | * | 2/2008 | | |
| WO | 2018007992 | | 1/2018 | | |

OTHER PUBLICATIONS

International Search Report for International Application PCT/US2020/015851, dated May 18, 2020.

* cited by examiner

MONOLITHIC SUSPENSION MODULE

CROSS-REFERENCE TO RELATED APPLICATIONS

This application claims priority to and the benefit of U.S. provisional application No. 62/799,303, filed on Jan. 31, 2019. The disclosure of the above application is incorporated herein by reference.

FIELD

The present disclosure relates to vehicle wheel suspension systems.

BACKGROUND

The statements in this section merely provide background information related to the present disclosure and may not constitute prior art.

In a vehicle, shock absorbers are used in combination with springs to reduce the effect of bumps in the road, thereby providing improved ride quality and vehicle handling. Shock absorbers are utilized in combination with suspension springs so that the shock absorber dampens the spring oscillations. Common shock absorbers use hydraulic fluid and/or pneumatic chambers along with valving to absorb excess energy from the springs. Shock absorbers have a tendency to be heavy and also require fluid sealing, which can result in periodic maintenance or repair.

These issues related to shock absorbers, among other issues related to noise, vibration, and harshness (NVH), and weight in motor vehicles, are addressed by the present disclosure.

SUMMARY

This section provides a general summary of the disclosure and is not a comprehensive disclosure of its full scope or all of its features.

According to one form of the present disclosure, a shock absorber comprises a monolithic elastomeric body comprising a first end and a second end. The first end is located near a vehicle chassis and the second end is located near a wheel. The monolithic elastomeric body is configured to transfer loads and provide a variable dampening and a variable stiffness from the first end to the second end.

In a variation, the monolithic elastomeric body includes a plurality of apertures disposed proximate the second end. In another such variation, the monolithic elastomeric body includes a plurality of ribs disposed proximate the first end.

In another variation, the monolithic elastomeric body includes a plurality of ribs disposed proximate the first end.

In a further variation, a first mounting fitting has a first connecting structure and a second mounting fitting has a second connecting structure. The monolithic elastomeric body is molded around the first connecting structure and the second connecting structure. In other such further variations, the first connecting structure includes a plate-like structure embedded within the monolithic elastomeric body. In even other such further variations, the second connecting structure includes a plate-like structure embedded within the monolithic elastomeric body. In yet other such further variations, the plate-like structure is connected to the first mounting fitting by a reduced diameter neck region.

In yet another variation, the elastomeric body further comprises apertures disposed proximate the second end, and the apertures define a honeycomb geometry.

In another form, a vehicle suspension system includes a suspension arm connected to a vehicle frame or body, a wheel supported by the suspension arm, and a shock absorber connected between the vehicle chassis and the suspension arm. The shock absorber includes a first mounting fitting having a first connecting structure and a second mounting fitting having a second connecting structure. A monolithic elastomeric body is secured to the first connecting structure and the second connecting structure, and the monolithic elastomeric body is configured to provide a predefined stiffness and dampening characteristics, wherein the monolithic elastomeric body has a lower stiffness near the second connecting structure and a higher dampening constant near the first connecting structure.

In a variation, the monolithic elastomeric body includes a plurality of apertures disposed proximate the second connecting structure. In other such variations, the monolithic elastomeric body includes a plurality of ribs disposed proximate the first connecting structure.

In another variation, the monolithic elastomeric body includes a plurality of ribs disposed proximate the first connecting structure.

In a yet other variation, the first connecting structure includes a plate-like structure embedded within the monolithic elastomeric body. In yet other such variations, the second connecting structures includes a plate-like structure embedded within the monolithic elastomeric body. In further other such variations, the plate-like structure of the second connecting structure is connected to the second mounting fitting by a reduced diameter neck region.

In a still further variation, the monolithic elastomeric body further comprises apertures disposed proximate the second end, and the apertures define a honeycomb geometry.

In another form, a shock absorber includes a monolithic elastomeric body having a first end and a second end. The first end comprises at least one of an aperture and a rib and the second end comprises at least one of an aperture and a rib. The first end is configured to absorb loads delivered to the wheel, and the second end is configured to provide dampening characteristics.

In a variation, the first end comprises a plurality of apertures and the second end comprises a plurality of apertures.

In another variation, a first mounting fitting has a first connecting structure and a second mounting fitting has a second connecting structure, and the monolithic elastomeric body is molded around the first connecting structure and the second connecting structure.

Further areas of applicability will become apparent from the description provided herein. It should be understood that the description and specific examples are intended for purposes of illustration only and are not intended to limit the scope of the present disclosure.

DRAWINGS

Figure 2:
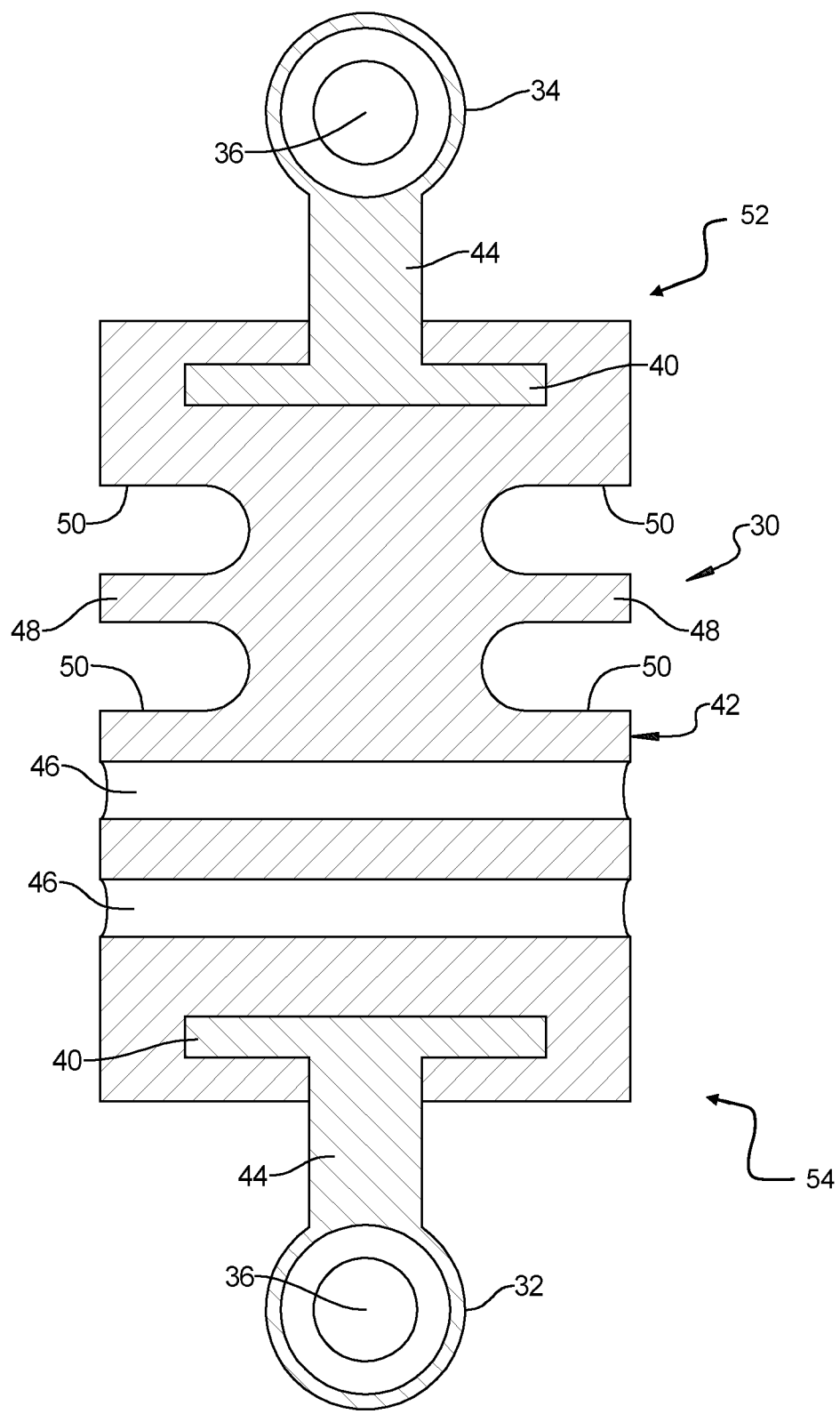

In order that the disclosure may be well understood, there will now be described various forms thereof, given by way of example, reference being made to the accompanying drawings, in which:

FIG. 1 is a perspective view of a vehicle wheel suspension system having a monolithic suspension module according to the principles of the present disclosure; and FIG. 2 is a cross-sectional view of an exemplary monolithic suspension module according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle wheel suspension system 10 is shown including a lower suspension arm 12 and an upper suspension arm 14 adapted to be mounted to a vehicle body or frame 16 (also referred to herein as a vehicle chassis). A steering knuckle 18 can be pivotally supported by the upper and lower suspension arms 14, 12. A wheel hub 20 is supported by the steering knuckle 18. The wheel hub 20 is adapted to support a wheel 22.

A monolithic suspension module 30 (also referred to herein as a shock absorber) is connected to the lower suspension arm 12 and the vehicle body or frame 16. As best shown in FIG. 2, the monolithic suspension module 30 can include a first mounting fitting 32 for connection to the lower suspension arm 12 and a second mounting fitting 34 for connection to the vehicle body or frame 16. The first and second mounting fittings 32, 34 can each include a mounting feature 36 for mounting to the lower suspension arm 12 and the vehicle body or frame 16, respectively. The mounting features 36 can take on various alternative forms including apertures, plates, clamps and other structures that can support or receive fasteners or connecting pins for mounting to the vehicle body or frame 16 and the suspension arm 12. The first and second mounting fittings 32, 34 each further include a connecting structure 40 embedded within a monolithic elastomeric body 42 such that the monolithic elastomeric body 42 is molded around the first connecting structure and the second connecting structure. Either or both of the first connecting structures 40 can include a plate-like structure embedded within the monolithic elastomeric body 42. Further, the first mounting fitting 32 may be disposed at a second end 54 of the monolithic elastomeric body 42, and the second mounting fitting 34 may disposed at a first end 52 of the monolithic elastomeric body 42. The connecting structures 40 can include a plate-like structure that is connected to the first and second mounting fittings 32, 34 by a reduced diameter neck region 44.

The monolithic elastomeric body 42 can include any material exhibiting elastic or rubber-like properties which may include various forms of rubbers, silicone and foams, including but not limited to natural rubber, isoprene rubber, butadiene rubber, Chloroprene rubber, Butyl rubber, Styrene-butadiene Rubber Nitrile rubber, Hydrogenated Nitrile Rubbers, ethylene propylene rubber, ethylene propylene diene rubber, Epichlorohydrin rubber, Polyacrylic rubber, Silicone rubber, Fluorosilicone Rubber, Fluoroelastomers, Perfluoroelastomers and open and closed cell foams.

The monolithic elastomeric body 42 can be in a shape of a square or rectangular block, a cylinder or other shape. The monolithic elastomeric body 42 can include apertures 46 and ribs 48 disposed between recesses 50 as shown in FIG. 1 in order to tune the monolithic elastomeric body 42 to include desired stiffness and dampening characteristics. In a variation, the monolithic elastomeric body 42 includes a plurality of apertures 46. The plurality of apertures 46 in a form are disposed proximate the second end 54. In another form, the monolithic elastomeric body 42 includes a plurality of ribs 48 disposed proximate the first end 52. The plurality of apertures 46 may define a honeycomb geometry.

By changing the features of the monolithic elastomeric body 42, the stiffness and dampening characteristics of the monolithic elastomeric body 42 can be controlled. As an example, as the first end 52 is located near the vehicle body or frame 16 and the second end 54 is located near the wheel 22, the monolithic elastomeric body 42 can be configured to transfer loads and provide a variable dampening and a variable stiffness from the first end 52 to the second end 54. More specifically, by including recesses 50 and/or ribs 48 near the first end 52 of the monolithic elastomeric body 42, lower stiffness characteristics at the first end 52 can be realized. Similarly, by including apertures 46 near the second end 54 of the monolithic elastomeric body 42, on the other hand, a higher dampening constant can be achieved. In this fashion, the monolithic elastomeric body 42 can be configured to absorb loads delivered to the wheel 22, and to provide predefined, desired dampening and stiffness characteristics, wherein the monolithic elastomeric body 42 has a lower stiffness near the first connecting structure 40 at the first end 52 and a higher dampening constant near the second connecting structure 40 at the second end 54. That said, it is believed that improving dampening characteristics can come at the cost of decreased stiffness characteristics and vice versa.

In yet other variations, the monolithic elastomeric body 42 has a first end 52 and a second end 54, and the first end 52 includes at least one of an aperture 46 and a rib 48, and the second end 54 includes at least one of an aperture 46 and a rib 48. In such a configuration, the first end 52 may be configured to absorb loads delivered to the wheel 22, whereas the second end 54 may be configured to provide dampening characteristics. In a further variation, the first end 52 may include a plurality of apertures 46 and the second end 54 may also include a plurality of apertures 46. As noted above, by including recesses 50 and/or ribs 48 near the first end 52 of the monolithic elastomeric body 42, lower stiffness characteristics at the first end 52 can be realized. Similarly, by including apertures 46 near the second end 54 of the monolithic elastomeric body 42, on the other hand, a higher dampening constant can be achieved. In this fashion, the monolithic elastomeric body 42 can be configured to absorb loads delivered to the wheel 22, and to provide predefined, desired dampening and stiffness characteristics, wherein the monolithic elastomeric body 42 has a lower stiffness near the first connecting realized. Similarly, by including apertures 46 near the second end 54 of the monolithic elastomeric body 42, on the other hand, a higher dampening constant can be achieved. In this fashion, the monolithic elastomeric body 42 can be configured to absorb loads delivered to the wheel 22, and to provide predefined, desired dampening and stiffness characteristics, wherein the monolithic elastomeric body 42 has a lower stiffness near the first connecting structure 40 at the first end 52 and a higher dampening constant near the second connecting structure 40 at the second end 54. That said, it is believed that improving dampening characteristics can come at the cost of decreased stiffness characteristics and vice versa.

In yet other variations, the monolithic elastomeric body 42 has a first end 52 and a second end 54, and the first end 52 includes at least one of an aperture 46 and a rib 48, and the second end 54 includes at least one of an aperture 46 and a rib 48. In such a configuration, the first end 52 may be configured to absorb loads delivered to the wheel 22, whereas the second end 54 may be configured to provide dampening characteristics. In a further variation, the first end 52 may include a plurality of apertures 46 and the second end 54 may also include a plurality of apertures 46. As noted above, by including recesses 50 and/or ribs 48 near the first end 52 of the monolithic elastomeric body 42, lower stiffness characteristics at the first end 52 can be realized. Similarly, by including apertures 46 near the second end 54 of the monolithic elastomeric body 42, on the other hand, a higher dampening constant can be achieved. In this fashion, the monolithic elastomeric body 42 can be configured to absorb loads delivered to the wheel 22, and to provide predefined, desired dampening and stiffness characteristics, wherein the monolithic elastomeric body 42 has a lower stiffness near the first connecting structure 40 at the first end 52 and a higher dampening constant near the second connecting structure 40 at the second end 54. It should thus be appreciated that any combination of geometric features (such as apertures, recesses, ribs, among others) and materials can be employed to achieve the variable dampening and stiffness along the length of the monolithic elastomeric body 42. As another example, the monolithic elastomeric body 42 may include reinforcements (i.e., forming a composite material) proximate the second connecting structure 40 to achieve a higher dampening constant. Accordingly, the term "monolithic elastomeric body" should be construed to mean a single-piece body comprising an elastomeric material, or a combination of elastomeric materials, in addition to other optional fillers.

The monolithic suspension module 30 of the present disclosure replaces a heavy metal spring and a damper system that is commonly filled with fluid and requires expensive seals and valving to perform properly. The valving and seals can leak and may require maintenance. Accordingly, the monolithic elastomeric body 42 provides a significant weight reduction and eliminates the need for expensive seals and valving.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A shock absorber comprising:
a monolithic elastomeric body comprising a first end and a second end, wherein the first end is located near a vehicle chassis and the second end is located near a wheel, wherein the monolithic elastomeric body includes a variable distribution of at least one of: ribs, apertures, materials along a length of the monolithic elastomeric body to transfer loads and provide a variable dampening and a variable stiffness from the first end to the second end,
wherein the monolithic elastomeric body includes a plurality of apertures disposed proximate the second end.

2. The shock absorber according to claim 1, wherein the monolithic elastomeric body incudes a plurality of ribs disposed proximate the first end.

3. The shock absorber according to claim 1, further comprising a first mounting fitting having a first connecting structure and a second mounting fitting having a second connecting structure, wherein the monolithic elastomeric body is molded around the first connecting structure and the second connecting structure.

4. The shock absorber according to claim 3, wherein the first connecting structure includes a plate-like structure embedded within the monolithic elastomeric body.

5. The shock absorber according to claim 4, wherein the second connecting structure includes a plate-like structure embedded within the monolithic elastomeric body.

6. The shock absorber according to claim 4, wherein the plate-like structure is connected to the first mounting fitting by a reduced diameter neck region.

7. The shock absorber according to claim 1, wherein the monolithic elastomeric body further comprises apertures disposed proximate the second end, the apertures defining a honeycomb geometry.

8. A vehicle suspension system comprising:
a suspension arm connected to a vehicle frame or body;
a wheel supported by the suspension arm;
a shock absorber connected between the vehicle frame or body and the suspension arm, the shock absorber including:
a first mounting fitting proximate the wheel and having a first connecting structure;
a second mounting fitting proximate the vehicle frame and having a second connecting structure; and
a monolithic elastomeric body secured to the first connecting structure and the second connecting structure, wherein the monolithic elastomeric body includes a variable distribution of at least one of: ribs, apertures, materials along a length of the monolithic elastomeric body to provide a predefined stiffness and dampening characteristics, wherein the monolithic elastomeric body has a lower stiffness near the second connecting structure and a higher dampening constant near the first connecting structure,
wherein the monolithic elastomeric body includes a plurality of apertures disposed proximate the second connecting structure.

9. The vehicle suspension system according to claim 8, wherein the monolithic elastomeric body incudes a plurality of ribs disposed proximate the first connecting structure.

10. The vehicle suspension system according to claim 8, wherein the first connecting structure includes a plate-like structure embedded within the monolithic elastomeric body.

11. The vehicle suspension system according to claim 10, wherein the second connecting structure includes a plate-like structure embedded within the monolithic elastomeric body.

12. The vehicle suspension system according to claim 10, wherein the plate-like structure of the first connecting structure is connected to the first mounting fitting by a reduced diameter neck region.

13. The vehicle suspension system according to claim 8, wherein the monolithic elastomeric body further comprises apertures disposed proximate the second connecting structure, the apertures defining a honeycomb geometry.

14. A shock absorber comprising:
a monolithic elastomeric body having a first end proximate to a vehicle frame and a second end proximate to a wheel, wherein the monolithic elastomeric body includes a variable distribution of a combination of: ribs, apertures, materials along a length of the monolithic elastomeric body, wherein the first end is configured to absorb loads delivered to the wheel, and the second end is configured to provide dampening characteristics,
wherein the first end comprises a plurality of apertures and the second end comprises a plurality of apertures.

15. The shock absorber according to claim 14, further comprising a first mounting fitting having a first connecting structure and a second mounting fitting having a second connecting structure, wherein the monolithic elastomeric body is molded around the first connecting structure and the second connecting structure.

* * * * *